United States Patent Office 3,429,659
Patented Feb. 25, 1969

3,429,659
PREPARATION OF PHOSPHORYL FLUORIDE AND DIFLUOROPHOSPHORIC ACID FROM PHOSPHATE ROCK
Robert A. Wiesboeck, Atlanta, Ga., assignor, by mesne assignments, to USS Agri-Chemicals, Inc., Pittsburgh, Pa., a corporation of Delaware
No Drawing. Filed July 19, 1966, Ser. No. 566,197
U.S. Cl. 23—139    10 Claims
Int. Cl. C01b 25/10

ABSTRACT OF THE DISCLOSURE

Phosphate rock is mixed with a fluorosulfonate salt such as an alkali or alkaline earth fluorosulfonate and the mixture heated to about 150–350° C. (preferably about 250° C.) to evolve vapors of phosphoryl fluoride or difluorophosphoric acid or both, and collecting the vapors. The vapors may be chilled under vacuum to condense separately the phosphoryl fluoride or difluorophosphoric acid.

---

This invention relates to the preparation of products from phosphate rock, and more particularly to the preparation of phosphoryl fluoride and fluorophosphoric acids through the reaction of phosphate rock with a fluorsulfonate salt.

Commercial preparation of phosphoryl fluoride is based on halogen transfer reactions involving phosphoryl chloride and hydrogen fluoride aided by a catalyst such as antimony pentachloride. Another method consists of heating phosphorus pentoxide with calcium fluoride to 500–1000° C. Fluorophosphoric acids, on the other hand, are produced by reacting phosphorus pentoxide with hydrogen fluoride. The resulting product contains a mixture of mono and difluorophosphoric acid.

All of the fluorophosphorus compounds discussed above are derived from phosphorus pentoxide which is accessible only through the electric furnace method. Such a method or procedure involves the reaction of phosphate rock with silica and carbon leading to elemental phosphorus which is oxidized to $P_2O_5$.

I have discovered a process by which phosphoryl fluoride and difluorophosphoric acid can be prepared directly from phosphate rock and a fluorosulfonate salt in a simple operation, at very low cost, the product being obtained in high purity and good yield. By heating a mixture of phosphate rock and a fluorosulfonate to temperatures at which phosphoryl fluoride and difluorophosphoric acid vapors are evolved, the two products may be recovered. It is possible then to fractionate the vapors through fractional condensation to obtain selectively the phosphoryl fluoride and difluorophosphoric acid. If metal equipment is used, a small amount of phosphorus trifluoride is also produced. By hydrolyzing the phosphoryl fluoride and difluorophosphoric acid, a high purity phosphoric acid and hydrogen fluoride may be produced.

A primary object, therefore, is to provide a process in which phosphate rock is reacted with a fluorosulfonate salt to provide important new products. A further object is to provide a process for the preparation of phosphoryl fluoride and fluorophosphoric acid directly from phosphate rock. Other specific objects and advantages will appear as the specification proceeds.

In one embodiment of the invention, a pulverized mixture of phosphate rock and a fluorosulfonate salt, such as an alkali or alkaline earth fluorosulfonate, is heated in a closed or open system to a temperature of about 150–350° C. to evolve phosphoryl fluoride and difluorophosphoric acid vapors. If metal equipment is used, a small amount of phosphorus trifluoride is also found in the product. Fractionation of the volatile reaction product may be achieved by known procedures, such as fractional condensation.

Some benefits may be attained by combining the phosphate rock and fluorosulfonate salt in any proportion. I prefer, however, for higher yield, to employ a ratio of about one part of phosphate rock to 1.5–3 parts of calcium fluorosulfonate or sodium or potassium fluorosulfonate. Generally, I employ about one part of phosphate rock to about two parts of fluorosulfonate.

In a specific example in which calcium fluorosulfonate is employed, the reaction takes place according to the equation:

$$Ca_3(PO_4)_2 + 3Ca(FSO_3)_2 \rightarrow 2POF_3 + 6CaSO_4$$

The primary reaction product is phosphoryl fluoride. Difluorophosphoric acid represents the hydrolysis product of $POF_3$:

$$POF_3 + H_2O \rightarrow HPO_2F_2 + HF$$

Accordingly, the amount of difluorophosphoric acid formed is dependent on the moisture and hydroxyl content of the starting material.

Hydroxyl is present in phosphate rock as hydroxyapatite which cannot be removed by heating up to 1000° C. Employing phosphate rock of 1.0–1.5% moisture content, the volatile P-material consists of approximately 1 part $POF_3$ and 2 parts $HPO_2F_2$. Drying of the reactants changes the ratio of volatile P-species in favor of $POF_3$. A composition of 2 parts $POF_3$ and 1 part $HPO_2F_2$ is typical for dry phosphate rock.

If metal equipment is used, a small amount of phosphorus trifluoride ($PF_3$) is also found in the product. This compound is formed by an oxygen transfer of $POF_3$ and the metal:

$$POF_3 + M \rightarrow PF_3MO$$

Prolonged contact time and high reaction temperatures increase the amount of $PF_3$ in the volatile product. However, in general, less than 10% of the volatile P-species is present as $PF_3$.

The temperature at which the mixture of phosphate rock and fluorosulfonate is heated is about 150–350° C. I prefer to employ a temperature of about 250° C. which readily produces phosphoryl fluoride and difluorophosphoric acid. While not essential, it is advantageous to employ freshly prepared calcium fluorosulfonate. The heating of the reaction mixture can be carried out in a closed or open system allowing the formed gases to accumulate or to vent off into cold traps or communicating chambers. The yield and the rate of the reaction is enhanced by the presence of a small amount of difluorophosphoric acid. It is preferred, therefore, that a portion of the difluorophosphoric acid be present in the reaction chamber at all times.

The collected phosphoryl fluoride, difluorophosphoric acid and phosphorus trifluoride may be condensed and recovered by any suitable procedure. I prefer to fractionate the volatile reaction product by condensing the vapors in a series of traps or communicating chambers maintained at graduated temperatures in a series for first condensing difluorophosphoric acid, then condensing phosphoryl fluoride, and finally condensing phosphorus trifluoride. For example, the series of traps may be maintained at about −20, −100 and −196° C.

Both phosphoryl fluoride and difluorophosphoric acid can be hydrolyzed to give phosphoric acid of high purity:

$$POF_3 + 3H_2O \rightarrow H_3PO_4 + 3HF$$
$$HPO_2F_2 + 2H_2O \rightarrow H_3PO_4 + 2HF$$

Specific examples illustrative of the invention may be set out as follows:

Example I

The following operation was carried out in a dry atmosphere employing phosphate rock and calcium fluorosulfonate of the following compositions:

Phosphate rock, $P_2O_5$: 34.7%; CaO: 47.5%; $SiO_2$ 5.57%; F: 3.51%; $Fe_2O_3$: 1.36%; $Al_2O_3$: 0.70%
Calcium fluorosulfonate, CaO: 23.4%; $SO_4^=$: 79.5%; F: 15.8%

Pulverized phosphate rock (100 g.) containing 1.5% moisture and freshly prepared calcium fluorosulfonate (215 g.) were intimately mixed by grinding in a mortar. The mixture was transferred to a 1-liter autoclave evacuated and gradually heated to 300° C. A pressure of approximately 200 p.s.i. developed. After heating for a total of 2 hours at 300° C., the volatile material was allowed to bleed off into an evacuated trapping system consisting of cold traps maintained at —20, —100 and —196° C. The latter trap was opened only if the pressure in the first two traps exceeded 100 mm. After all volatile material had been collected, the —20° trap was adjusted to 0° while open to the —100° trap.

The fractionated material consisted of 20.5 g. difluorophosphoric acid (0° trap), 11.1 g. phosphoryl fluoride (—100° trap), and 2.0 g. phosphorus trifluoride (—196° trap), representing 67.3% of the total $P_2O_5$ value of the employed phosphate rock.

Example II

Using the phosphate rock and calcium fluorosulfonate composition as described in Example I, an intimate mixture of phosphate rock (10.0 g.) and calcium fluorosulfonate (21.5 g.) was heated in a Teflon reactor to 200° C. for four hours while the formed gas was allowed to expand into the attached trapping system as described in Example I. At the end of the reaction, nitrogen was passed through the vessel to collect all volatile material. The —20° trap contained 1.0 g. difluorophosphoric acid and the —100° trap 2.4 g. phosphoryl fluoride. Both compounds accounted for 69% of the $P_2O_5$ content of the employed phosphate rock.

Example III

Phosphate rock (10.0 g.) and calcium fluorosulfonate (21.5 g.) were heated in a steel reactor under vacuum to 250° C. for four hours, while the gaseous reaction products were condensed in attached cold traps at —20, —100 and —196° C. as described in Example I. The collected difluorophosphoric acid (0.9 g.) and phosphoryl fluoride (1.6 g.) corresponded to 51% of the original $P_2O_5$ value of the phosphate rock.

Example IV

Chemically pure tricalcium phosphate (5.2 g.) and calcium fluorosulfonate (12.4 g.) were heated an the volatile material collected as in Example I. The obtained difluorophosphoric acid (1.2 g.) and phosphoryl fluoride (1.1 g.) represented 70.5% of the total $P_2O_5$ value.

Example V

Phosphate rock and calcium fluorosulfonate of the compositions described in Example I were combined in the proportion of about one part of phosphate rock to about two parts of the fluorosulfonate and intimately mixed by grinding in a mortar. The mixture was transferred to a 1-liter autoclave which was evacuated and gradually heated to about 300° C. A pressure of approximately 200 p.s.i. developed. After heating for a total of 2 hours at 300° C., the vapors consisting of phosphoryl fluoride vapors and difluorophosphoric acid vapors were collected as product.

Example VI

A mixture of phosphate rock (10.0 g.) and sodium fluorosulfonate (22.0 g.) was heated to 220° C. in a Teflon reactor for four hours, while the volatile reaction product was allowed to expand into a series of cold traps as described in Example I. The collected difluorophosphoric acid (1.4 g.) and phosphoryl fluoride (1.3 g.) accounted for 53.8% of the $P_2O_5$ value of the phosphate rock.

Example VII

Heating of phosphate rock (10.0 g.) and potassium fluorosulfonate (25.2 g.) to 220° C. for four hours in a Teflon reactor similar to the procedure described in Example I produced difluorophosphoric acid (1.7 g.) and phosphoryl fluoride (1.4 g.) corresponding to 61.4% of the $P_2O_5$ of the phosphate rock.

Example VIII

Phosphoryl fluoride obtained as described in Example I was hydrolyzed by the addition of 3 parts of water to obtain high purity phosphoric acid, while hydrogen fluoride was recovered as a separate product, the reaction being as follows:

$$POF_3 + 3H_2O \rightarrow H_3PO_4 + 3HF$$

Example IX

Difluorophosphoric acid obtained as described in Example I was hydrolyzed by adding 2 parts of water to prepare high purity phosphoric acid, while also providing as a separate product hydrogen fluoride, the reaction being as follows:

$$HPO_2F_2 + 2H_2O \rightarrow H_3PO_4 + 2HF$$

While in the foregoing specification I have set forth specific procedure in considerable detail for the purpose of illustrating embodiments of the invention, it will be understood that such details may be varied widely by those skilled in the art without departing from the spirit of my invention.

I claim:

1. In a process for the preparation of phosphoryl fluoride and difluorophosphoric acid from phosphate rock, the steps of heating a mixture of said rock and a fluorosulfonate salt selected from the group consisting of an alkali and alkaline earth fluorosulfonate at a temperature of about 150–350° C. to evolve phosphoryl fluoride and difluorophosphoric acid vapors, and collecting said vapors.

2. The process of claim 1 in which the collected vapors are fractionally condensed to yield separate phosphoryl fluoride and difluorophosphoric acid products.

3. The process of claim 1 in which the fluorosulfonate is freshly prepared fluorosulfonate.

4. The process of claim 1 in which the fluorosulfonate is calcium fluorosulfonate.

5. In a process for the preparation of phosphoryl fluoride and difluorophosphoric acid directly from phosphate rock, the steps of heating a mixture of phosphate rock and a fluorosulfonate salt selected from the group consisting of calcium, sodium and potassium fluorosulfonate, at a temperature of about 150–350° C. to evolve phosphoryl fluoride vapors and difluorophosphoric acid vapors, and collecting the vapors.

6. The process of claim 5 in which said phosphoryl fluoride vapors are chilled under vacuum to about —100° C. to condense the vapors.

7. The process of claim 5 in which said difluorophosphoric acid vapors are chilled under vacuum at a temperature of about —20° C. to condense the difluorophosphoric acid vapors.

8. The process of claim 1 in which the heating of the mixture of phosphate rock and fluorosulfonate salt is carried out in a metal container and a small amount of phosphorous trifluoride vapors are additionally evolved.

9. The process of claim 5 in which water is added to the phosphoryl fluoride to produce phosphoric acid and hydrogen fluoride.

10. In a process for the preparation of phosphoryl fluoride and difluorophosphoric acid directly from phosphate rock, the steps of heating a pulverized mixture of phosphate rock and calcium fluorosulfonate at a temperature of about 250° C. to evolve phosphoryl fluoride vapors and difluorophosphoric acid vapors, subjecting the vapors to a temperature of about −20° C. under vacuum for the condensation of difluorophosphoric acid, and subjecting the remaining vapors to a temperature of about −100° C. under vacuum for the condensation of phosphoryl fluoride.

References Cited

UNITED STATES PATENTS

| | | | |
|---|---|---|---|
| 2,408,785 | 10/1946 | Lange | 23—139 |
| 2,423,895 | 7/1947 | Lange et al. | 23—139 |
| 2,488,298 | 11/1949 | Lange et al. | 23—139 |
| 2,570,924 | 10/1951 | Dupont | 23—203 |
| 2,712,494 | 7/1955 | Dupont | 23—203 |

OTHER REFERENCES

Berak: "Chemical Abstracts," vol. 57, November 1962, pp. 11910–11911.

Hayek et al.: "Chemical Abstracts," vol. 50, 1956, p. 3133.

Lange et al.: "Chemical Abstracts," vol. 41, p. 4397, 1947.

OSCAR R. VERTIZ, *Primary Examiner.*

HERBERT T. CARTER, *Assistant Examiner.*

U.S. Cl. X.R.

23—153, 165, 203, 368